United States Patent
Gruber et al.

(10) Patent No.: US 8,950,946 B2
(45) Date of Patent: Feb. 10, 2015

(54) FRICTION DEVICE FOR A BEARING ASSEMBLY, BEARING AND BEARING ASSEMBLY COMPRISING SUCH A FRICTION DEVICE

(75) Inventors: Andreas Gruber, Maria Buch-Feistritz (AT); Christian Kogler, Oberkurzheim (AT); Francois Niarfeix, Saint-Cyr sur Loire (FR); Alexandre Taillepied, Saint Pierre des Corps (FR)

(73) Assignee: Aktiebolaget SKF, Gothenburg (SE)

( * ) Notice: Subject to any disclaimer, the term of this patent is extended or adjusted under 35 U.S.C. 154(b) by 105 days.

(21) Appl. No.: 13/702,482

(22) PCT Filed: Jun. 23, 2010

(86) PCT No.: PCT/IB2010/001933
§ 371 (c)(1),
(2), (4) Date: Feb. 20, 2013

(87) PCT Pub. No.: WO2011/161492
PCT Pub. Date: Dec. 29, 2011

(65) Prior Publication Data
US 2013/0209010 A1  Aug. 15, 2013

(51) Int. Cl.
*F16C 33/76* (2006.01)
*F16C 41/00* (2006.01)
*B62D 5/00* (2006.01)
*F16C 33/78* (2006.01)
*F16J 15/32* (2006.01)
*F16D 63/00* (2006.01)

(52) U.S. Cl.
CPC .............. *F16C 41/001* (2013.01); *B62D 5/005* (2013.01); *F16C 33/78* (2013.01); *F16J 15/3208* (2013.01); *F16D 63/00* (2013.01)
USPC .......................................... 384/484; 277/560

(58) Field of Classification Search
USPC ................... 384/484–486; 277/551, 557, 560
See application file for complete search history.

(56) References Cited

U.S. PATENT DOCUMENTS

| | | | |
|---|---|---|---|
| 2,591,129 A | 4/1952 | Brouwer | |
| 3,830,508 A | 8/1974 | Endicott | |
| 4,151,999 A | 5/1979 | Ringel et al. | |
| 6,722,659 B2 * | 4/2004 | Mohr | 277/560 |
| 8,328,201 B2 * | 12/2012 | Epshetsky | 277/551 |
| 8,328,202 B2 * | 12/2012 | Foster et al. | 277/572 |
| 8,651,496 B2 * | 2/2014 | Kurth et al. | 277/549 |
| 8,684,362 B2 * | 4/2014 | Balsells et al. | 277/353 |

FOREIGN PATENT DOCUMENTS

| | | |
|---|---|---|
| DE | 7024176 U | 1/1973 |
| EP | 1058792 B1 | 8/2005 |
| GB | 906366 A | 9/1962 |
| WO | WO2004091995 A2 | 10/2004 |
| WO | WO2006030090 A1 | 3/2006 |

* cited by examiner

*Primary Examiner* — Thomas R. Hannon
(74) *Attorney, Agent, or Firm* — Bryan Peckjian; SKF USA Inc. Patent Dept.

(57) ABSTRACT

A friction device for a bearing assembly includes an annular friction module defining a friction surface that extends around a revolution axis of the friction device and that is configured to lie against and to exert a friction torque on a cylindrical surface rotating with respect to the friction device, the friction surface being cylindrical before the friction device is mounted around the rotating cylindrical surface.

20 Claims, 2 Drawing Sheets ized by a circular contact line of a portion
FRICTION DEVICE FOR A BEARING ASSEMBLY, BEARING AND BEARING ASSEMBLY COMPRISING SUCH A FRICTION DEVICE

CROSS-REFERENCE

This application is the U.S. national stage of International Application No. PCT/IB2010/001933 filed on Jun. 23, 2010, which is herein incorporated by reference in its entirety.

TECHNICAL FIELD OF THE INVENTION

The invention relates to a friction device for a bearing assembly. The invention also relates to a bearing and to a bearing assembly comprising such a friction device.

BACKGROUND OF THE INVENTION

Rotating assemblies in automotive vehicles are generally equipped with bearings and seals. A portion of the seal can lie against a rotating shaft in order to prevent moisture or dust to get in the bearing. Contact with the surface of the rotating shaft is generally made by a circular contact line of a portion of the seal.

In case the bearing assembly is mounted on a steering wheel assembly of the vehicle, one can need to provide a smooth resistance effort to the rotation of the steering wheel, in order for the driver to "feel" the direction of the vehicle and to have a better driving sensation.

To bring this resistance effort, it is known from WO-2006/030090 or EP-B-1 058 792 to generate a friction torque on the steering wheel shaft thanks to the seal associated to the bearing assembly which controls the rotation of the steering wheel. The seal can therefore be equipped with a circular spring, in order to press the seal against the surface of the rotating shaft.

As the friction torque is a side effect of the seal, its structure is not adapted to exert a regular friction torque. The contact between the seal and the rotating surface is only made by a tapered toroidal surface, which defines before mounting a line of contact. When contact is made with the rotating surface, the contact surface is slightly enlarged, but the fact that the contact surface is initially a line may induce damages of the seal. Moreover, this thin contact surface does not provide enough friction torque.

SUMMARY OF THE INVENTION

This invention aims at proposing a friction device that permits to exert a friction torque on a rotating part with greater efficiency than a simple seal which is not initially adapted to exert such a torque.

To this end, the invention concerns a friction device for a bearing assembly. This friction device is characterized in that it comprises an annular friction module defining a friction surface, which extends around a revolution axis of the friction device and is adapted to lie against and to exert a friction torque on a cylindrical surface rotating with respect to the friction device, and in that the friction surface is cylindrical before mounting of said friction device around said rotating cylindrical surface.

Thanks to the invention, the friction surface, which exerts the friction torque is broader on the device according to the invention than on seals generally used in the prior art. This permits to exert more friction torque and to prevent damages on the friction device.

According to further aspects of the invention which are advantageous but not compulsory, such a friction device might incorporate one or several of the following features:
- The friction module comprises a radially extending dust seal lip.
- It comprises an annular spring adapted to press, thanks to a radial effort, the friction surface against the cylindrical surface.
- The radial section of the friction module comprises a constriction defining a hinge between the friction surface and a main portion of the friction module fast with the frame.
- The friction surface is carried by a portion delimited by two surfaces making an angle with respect to a radial direction, whereas the value of said angle is inferior to 30°, preferably 20°.
- The portion which carries the friction surface extends, along the radial direction, from a main portion of the friction module by a wear layer.
- The thickness of the wear layer approximately equals one quarter of the width of the friction surface, along the revolution axis of the friction device, most preferably of 0.5 mm.
- It is adapted to be mounted on an inner cylindrical surface, whereas the friction module exerts a radial elastic effort towards the revolution axis of the friction device.
- It is adapted to be mounted on an outer cylindrical surface, whereas the friction module exerts an elastic effort in a direction opposed to the revolution axis of the friction device.
- The width of the friction surface, along the revolution axis of the friction device, is superior to 0.5 mm, preferably superior to 1 mm, most preferably of about 2 mm.
- It comprises an annular frame with which the friction module is fast.

The invention also concerns a bearing, comprising an above-mentioned friction device fast in rotation with one of the rings of the bearing.

The invention also concerns a bearing assembly comprising a rotating shaft and a bearing, characterized in that an above-mentioned friction device is mounted on the shaft.

According to further aspects of the invention which are advantageous but not compulsory, such a bearing assembly might incorporate one or several of the following features:
- The friction device is fast in rotation with the outer ring of the bearing and exerts a friction torque on the shaft.
- The friction device is fast in rotation with the inner ring of the bearing and exerts a friction torque on a cylindrical surface on which the outer ring of the bearing is mounted.

BRIEF DESCRIPTION OF THE DRAWINGS

The invention will now be explained in correspondence with the annexed figures and as an illustrative example, without restricting the object of the invention.

In the annexed figures.

DETAILED DESCRIPTION OF SOME EMBODIMENTS

Figure 1:
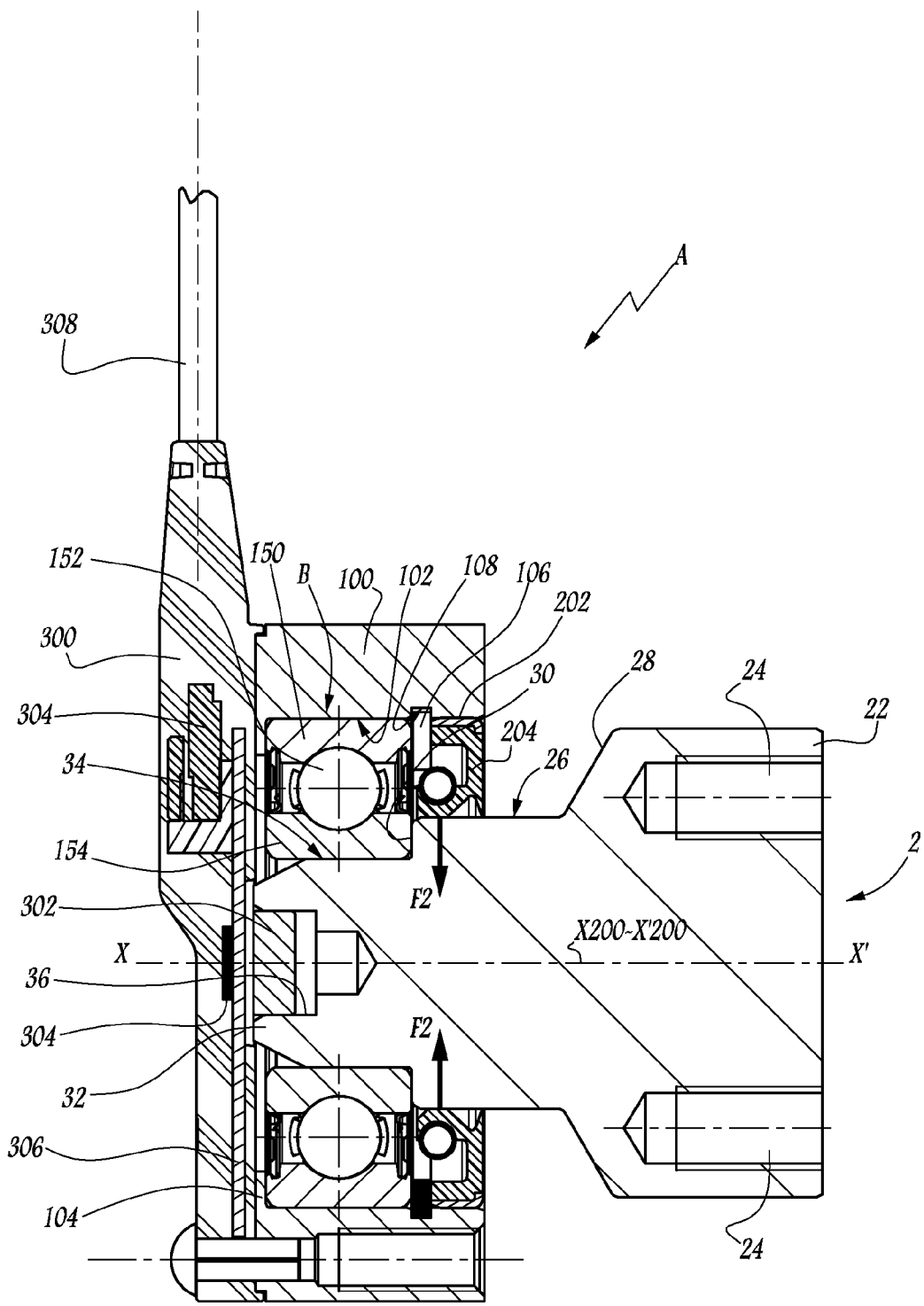
FIG. 1 is a sectional view, along a revolution axis, of a bearing assembly embodying the invention.
Figure 2:
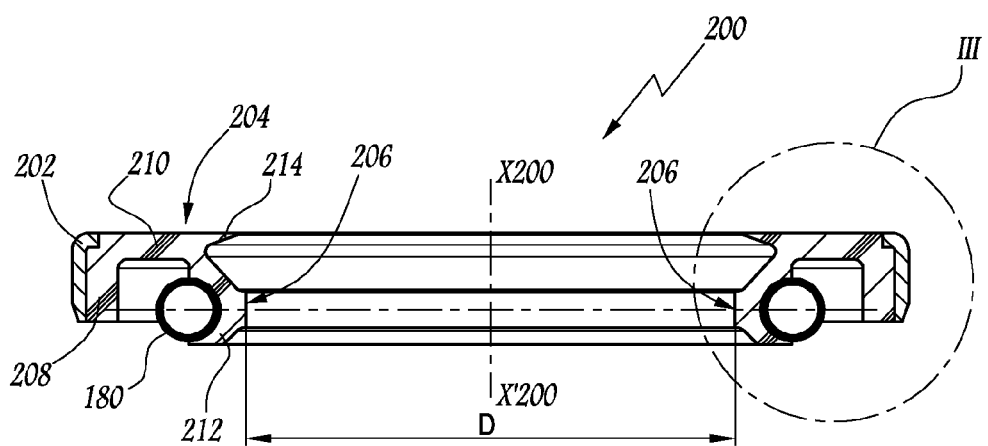
FIG. 2 is a sectional view, along a revolution axis, of a friction device according to the invention.
Figure 3:
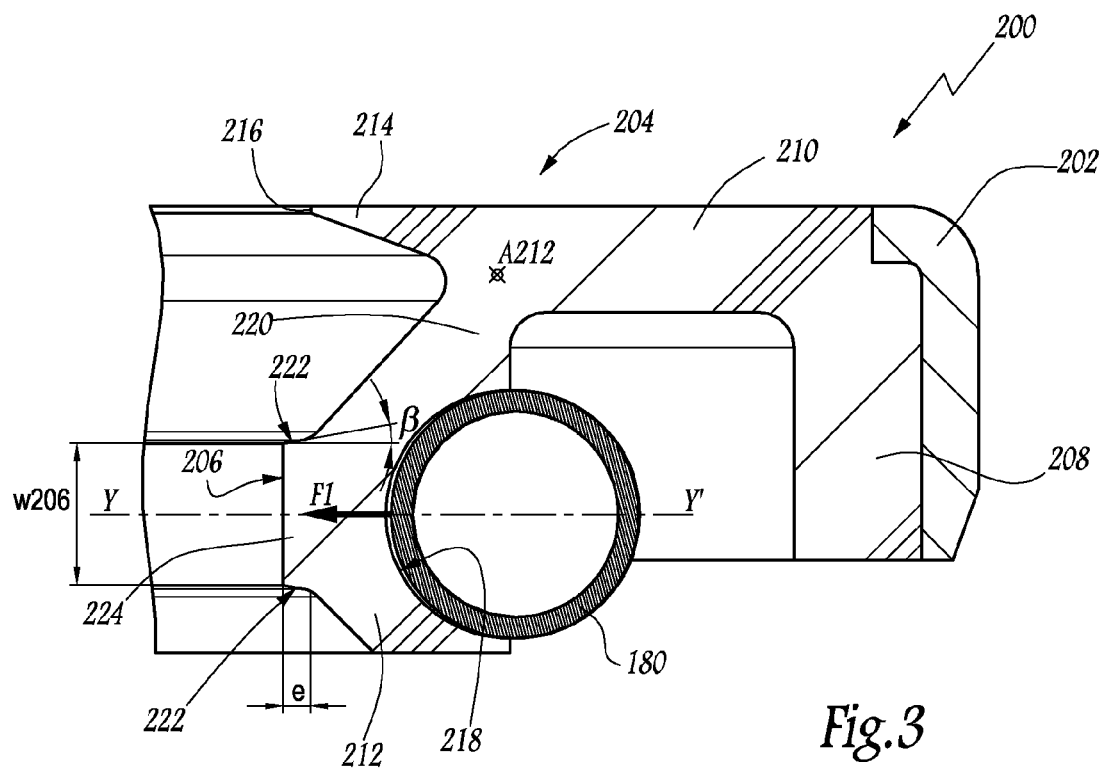
FIG. 3 is a view on a larger scale of detail III on FIG. 2.

As illustrated on FIG. 1, a bearing assembly A comprises a shaft 2 rotating along an axis X-X'. On one end 22 of shaft 2, threaded bores 24 are drilled parallely to axis X-X'. These bores 24 are adapted to receive screws to fast, for instance, a steering wheel of a vehicle in which the bearing assembly A is installed.

Shaft 2 comprises an outer central cylindrical surface 26 which extends between a tapered shoulder 28 on the side of end 22 and another shoulder 30 on the side of an end 32 opposed to end 22 along axis X-X'. Between shoulder 30 and end 32, shaft 2 comprises a cylindrical surface 34, whose diameter is inferior to the diameter of cylindrical surface 26. End 32 of shaft 2 comprises a bore 36 drilled along axis X-X'.

Bearing assembly A also comprises a housing 100 adapted to receive shaft 2, a bearing B and a friction device 200. Bearing B is mounted on an inner cylindrical surface 102 of housing 100. Bearing B comprises an outer ring 150, bearing balls 152 and an inner ring 154 mounted around cylindrical surface 34 of shaft 2.

Bearing B is blocked in translation along axis X-X' by a shoulder 104 of housing 100 on the side of end 32 of shaft 2 and by an elastic ring 106 housed in a groove 108 on the other side.

Bearing assembly A also comprises a sensing device 300 fixed to housing 100. Sensing device 300 comprises a magnet 302 inserted in bore 36 of shaft 2. Measurement device 300 also comprises various sensors components 304 adapted to measure, for instance, the rotation angle of shaft 2. These components are mounted on a printed circuit board 306 and adapted to transmit, by an electronic cable 308, steering orders to an electronic control unit of the vehicle.

Friction device 200 is mounted on the inner surface 102 of housing 100. Friction device 200 comprises a frame 202 made of steel and press fitted into inner surface 102. Friction device 200 comprises a friction module 204 made from a polymer material and fixed to frame 202 by any mean known per se. Friction device 200 is toroidally shaped along an axis X200-X'200, which is the revolution axis of device 200.

Axes X-X' and X200-X'200 are superimposed when friction device 200 is mounted within housing 100, around shaft 2.

Friction module 204 comprises a friction surface 206. Friction surface 206 is cylindrical along axis X200-X'200 and is adapted to lie against cylindrical surface 26 of shaft 2. As the inner diameter D of surface 206 is slightly inferior the outer diameter of surface 26, an elastic effort F2 is excited by friction module 204 on surface 26 along a centripetal direction, that is radially and inwardly with respect to axis X-X'. This elastic effort F2 induces a friction torque, which resists the rotation of shaft 2 around axis X-X'.

Friction module 204 is formed of three portions. A first axial portion 208, extending parallely to axis X200-X'200 is fixed to frame 202. From one end of portion 208 extends a second radial portion 210, which extends perpendicularly to portion 208. A third portion 212, on which friction surface 206 is made, extends in a direction approximately perpendicular to radial portion 210.

In the vicinity of shaft 2, radial portion 210 comprises a radially extending dust seal lip 214. The tip 216 of lip 214 is adapted to be in sliding contact with cylindrical surface 26 of shaft 2. Dust seal lip 214 prevents dust and other particulates, like particulates from worn out metallic parts, from reaching the interface area between friction surface 206 and cylindrical surface 26 and damaging these surfaces.

Portion 212 of friction module 204 comprises a peripheral groove 218 facing axial portion 208 and adapted to receive a toroidal spring 180. Spring 180 is adapted to exert a centripetal effort F1, which presses friction surface 206 on outer surface 26 of shaft 2. This effort F1 makes the friction torque exerted by friction surface 206 greater.

Between radial portion 210 and portion 212 extends a constricted area 220, which acts as a hinge between these two portions 210 and 212. Thanks to this hinge 220, portion 212 can slightly rotate with respect to portion 210 along an axis A212 perpendicular to the plane of the drawing. Portion 212 can therefore absorb small alignment defaults of the rotation of shaft 2, in order for them not to be transmitted to the other portions of friction module 204.

For a friction device 200 having an internal diameter D between 10 and 40 mm, friction surface 206 has a width w206 superior to 0.5 mm. Preferably width w206 is superior to 1 mm and most preferably equal to 2 mm.

Friction surface 206 is delimited by two lateral surfaces 222, which are slightly angled with respect to a radial direction Y-Y'.

The angle $\beta$ between surfaces 222 and radial direction Y-Y' is inferior to 30° and preferably equal to 20°. In an alternate embodiment, lateral surfaces 222 may be parallel to radial axis Y-Y'.

Lateral surfaces 222 extend from portion 212 by a distance e which may approximately equal one quarter of width w206, or preferably 0.5 mm. Surfaces 222 define, together with friction surface 206, a wear layer 224 extending from portion 212. This wear layer 224 has a thickness which equals distance e and allows friction surface 206 to be worn out for a certain period of time and to exert, during this period time, a substantially constant friction torque.

In case shaft 2 is rotated by the driver, friction module 204 exerts a friction torque against surface 26. The value of the friction torque can be modified by changing the dimensional characteristics of friction module 204. For instance, the width w206 of friction surface 206 can be extended in order to provide a greater friction torque. The diameter D of cylindrical friction surface 206 can also be reduced in order to exert a greater elastic effort F2 towards axis X-X' and therefore induce a greater friction torque.

To vary the value of the friction torque, one can also use different stiffness values for spring 180. In order to increase the value of the friction torque, one can mount a spring 180 with a higher stiffness value. In an alternate and non-shown embodiment, friction device 200 may comprise no toroidal spring. Then, elastic effort F2 results only from the elasticity of friction module 204.

Friction device 200 is represented here as fast in rotation with outer ring 150 of bearing B and with housing 100. In an alternate and not-shown embodiment, friction device 200 may be fast in rotation with shaft 2 and with inner ring 154. In that case, the construction of friction device 200 can be inverted, frame 202 being press fitted on external cylindrical surface 26 of shaft 2 and friction surface 206 being an outer cylindrical surface exerting the friction torque on inner surface 102 of housing 100. In that case, spring 180 may exert elastic effort F1 in a centrifugal direction opposed to axis X-X'.

Bearing assembly A is described here with inner ring 154 rotating with respect to outer ring 150. In an alternative embodiment, outer ring 150 may rotate with respect to inner ring 154 and friction device be fast in rotation either with inner ring 154 or outer ring 150.

The use of a friction device according to the invention permits to provide a good feeling sensation to the driver of the vehicle, with a less expensive device, with respect to seals used to generate a friction torque.

Moreover, cylindrical friction surface 206 of friction device 200 provides an increased radial compacity and an increased friction torque than a seal.

To provide more possibilities of variation of the friction torque exerted by friction device 200, the characterics of cylindrical surface 26 may be adjusted. For instance, the rugosity of surface 26 may be chosen on accordance with the friction torque needed.

Interface area between external surface 26 and friction surface 206 of friction device 200 may be lubricated with grease in order to absorb vibrations, reduce noises and provide a greater stability to bearing assembly A. Obviously, such a lubrication induces a decrease of the friction torque exerted by friction module 200.

According to an alternate and not shown embodiment, friction device 200 may comprise no frame and friction module 204 may be directly fast with inner surface 102 with any adapted mean.

The invention claimed is:

1. A friction device for a bearing assembly, the friction device comprising:
an annular friction module defining a friction surface which extends around a revolution axis of the friction device, the annular friction module comprising an annular portion, a flange projecting from a radially outer edge of the annular portion and a pressure portion connected to the annular portion by a hinge radially inward of the flange,
the pressure portion comprising a body having first and second radially spaced walls, the first wall including a groove and the second wall forming the friction surface, the friction surface being intersected by a radial plane, the body further including first and second non-parallel side walls tapering away from each other and away from the radial plane from the friction surface to a first location spaced from the friction surface, the first and second side walls tapering away from each other and the radial plane at a first rate from the friction surface to a second location between the friction surface and the first location and tapering away from each other and the radial plane at a second rate greater than the first rate from the second location to the first location,
the annular friction module being configured to lie against and to exert a friction torque on a cylindrical surface rotating with respect to the friction device, and wherein
the friction surface is cylindrical before mounting of the friction device around the rotating cylindrical surface.

2. The friction device according to claim 1, wherein the friction module provides a radially extending dust seal lip.

3. The friction device according to claim 1, wherein the cylindrical surface is an outer surface and further comprising an annular spring adapted to exert a centripetal force that presses the friction surface onto the outer surface.

4. The friction device according to claim 1, wherein the first and second side walls each include a first portion angled at a first angle relative to the radial plane and a second portion angled at a second angle relative to the radial plane, the second angle being greater than the first angle.

5. The friction device according to claim 4, wherein the first portion of the first and second side walls is located between the friction surface and the second location and the second portion of the first and second side walls is located between the second location and the first location.

6. The friction device according to claim 4, wherein the first angle is less than 30°.

7. The friction device according to claim 6, including a wear layer between the friction surface and the second location.

8. The friction device according to claim 7, wherein the thickness of the wear layer approximately equals 0.5 mm, along the revolution axis of the friction device.

9. The friction device according to claim 7, wherein the thickness of the wear layer approximately equals one quarter of the width of the friction surface, along the revolution axis of the friction device.

10. The friction device according to claim 1, wherein the device is adapted to be mounted on an inner cylindrical surface, and wherein the friction module exerts a radial elastic effort towards the revolution axis of the friction device.

11. The friction device according to claim 1, wherein the width of the friction surface, along the revolution axis of the friction device is greater than 0.5 mm.

12. The friction device according to claim 1, wherein the friction device further comprises an annular frame with which the friction module is fastened.

13. A bearing assembly, comprising:
an inner ring and an outer ring; and
a friction device according to claim 1 fastened in rotation with the inner ring or the outer ring.

14. A bearing arrangement, comprising
a rotating shaft and
the bearing assembly of claim 13.

15. The bearing arrangement according to claim 14, wherein the friction device is fastened in rotation with the outer ring of the bearing assembly and exerts a friction torque on the shaft.

16. The friction device according to claim 1, wherein the width of the friction surface, along the revolution axis of the friction device is greater than 1 mm.

17. The friction device according to claim 1, wherein the width of the friction surface, along the revolution axis of the friction device is about 2 mm.

18. The friction device according to claim 1, wherein the first and second side walls are symmetric relative to the radial plane.

19. The friction device according to claim 1, wherein the radial plane intersects a bottom of the groove.

20. A friction device for a bearing assembly, the friction device comprising:
an annular friction module defining a friction surface, which extends around a revolution axis of the friction device, and
adapted to lie against and to exert a friction torque on a cylindrical surface rotating with respect to the friction device, and wherein
the friction surface is cylindrical before mounting of the friction device around the rotating cylindrical surface, and
wherein the friction surface is supported by a portion delimited by two surfaces making an angle ($\beta$) with respect to a radial direction, and wherein the value of said angle ($\beta$) is 20°.

* * * * *